United States Patent
Hu et al.

(10) Patent No.: US 11,809,043 B2
(45) Date of Patent: Nov. 7, 2023

(54) BACKLIGHT MODULE, FORMING METHOD THEREOF, AND DISPLAY DEVICE

(71) Applicant: HKC CORPORATION LIMITED, Shenzhen (CN)

(72) Inventors: Xiaogang Hu, Shenzhen (CN); Haoxuan Zheng, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/066,215

(22) Filed: Dec. 14, 2022

(65) Prior Publication Data

US 2023/0213817 A1     Jul. 6, 2023

(30) Foreign Application Priority Data

Dec. 31, 2021    (CN) .......................... 202111674250.X (51) Int. Cl.
    *G02F 1/1335*    (2006.01)
    *G02F 1/13357*   (2006.01)

(52) U.S. Cl.
    CPC .. *G02F 1/133628* (2021.01); *G02F 1/133603* (2013.01)

(58) Field of Classification Search
    CPC ..................... G02F 1/133628; G02F 1/133603
    See application file for complete search history.

(56) References Cited

U.S. PATENT DOCUMENTS

| | | | |
|---|---|---|---|
| 2012/0181915 A1* | 7/2012 | Yamamoto | H10K 50/8428 313/46 |
| 2020/0028047 A1 | 1/2020 | Su | |
| 2021/0263379 A1* | 8/2021 | Lee | G02F 1/133606 |

FOREIGN PATENT DOCUMENTS

| | | | |
|---|---|---|---|
| CN | 203757525 | | 8/2014 |
| CN | 204285131 | | 4/2015 |
| CN | 204437834 | | 7/2015 |
| CN | 108761905 | | 11/2018 |
| CN | 208351207 | | 1/2019 |
| CN | 208351207 U | * | 1/2019 ........... G02F 1/1333 |
| CN | 109597242 | | 4/2019 |

(Continued)

OTHER PUBLICATIONS

CNIPA, First Office Action for CN Application No. 202111674250. X, dated Jul. 7, 2022.
(Continued)

*Primary Examiner* — Fatima N Farokhrooz
(74) *Attorney, Agent, or Firm* — Hodgson Russ LLP (57) ABSTRACT

A backlight module includes a drive substrate and a plurality of light sources. The drive substrate has a first side on which the plurality of light sources are provided at intervals. The backlight module further includes a first heat dissipation layer. The first heat dissipation layer is a transparent film and disposed on the first side of the drive substrate and located between adjacent light sources, to be directly in contact with the light sources, so as to block the light sources and absorb the heat of the light source and radiate heat, which is beneficial for reducing or eliminating the thermal coupling between adjacent light sources and helping the first side of the drive substrate to dissipate heat, so that the designed backlight module has better thermal stability and longer service life.

10 Claims, 3 Drawing Sheets

(56) References Cited

FOREIGN PATENT DOCUMENTS

| CN | 109597242 B | * 10/2020 | ....... G02F 1/133603 |
| CN | 112114455 | 12/2020 | |
| CN | 113534534 | 10/2021 | |

OTHER PUBLICATIONS

CNIPA, Second Office Action for CN Application No. 202111674250.X, dated Oct. 31, 2022.

* cited by examiner

BACKLIGHT MODULE, FORMING METHOD THEREOF, AND DISPLAY DEVICE

CROSS-REFERENCE TO RELATED APPLICATION

This application claims priority to Chinese Patent Application No. 202111674250.X, filed Dec. 31, 2021, the entire disclosure of which is incorporated herein by reference.

FIELD OF TECHNOLOGY

The present disclosure relates to the display field, more particularly, to a backlight module, a forming method thereof and a display device.

BACKGROUND

Micro/Mini LED (Mini Light Emitting Diode) is a kind of LCD (Liquid Crystal Display) backlight technology. Through the introduction of packaging, miniaturization and huge transfer technology, it improves the control ability of backlight module, reduces the optical distance of backlight, and then achieves ultra-thin and high dynamic contrast backlight technology.

With the increasing demand for the resolution and brightness of Micro/Mini LED, the number of LEDs per unit area is increasing, the distance between LEDs is shrinking, the driving current of a single LED is getting larger, and the display will have the demand for long-term work, which will lead to an increase of calorific value of a single LED and the increase of thermal coupling effect between adjacent LEDs, and effective heat dissipation cannot be carried out.

SUMMARY

There are provided a backlight module, a forming method thereof, and a display device according to embodiments of the present disclosure. The technical solution is as below:

According to a first aspect of embodiments of the present disclosure, there is provided a backlight module including a drive substrate having a first side; and a plurality of light sources provided at intervals on the first side of the drive substrate, the backlight module further includes:

a first heat dissipation layer disposed on the first side of the drive substrate and between adjacent light sources, the first heat dissipation layer being a transparent film.

According to a second aspect of embodiments of the present disclosure, there is provided a forming method of a backlight module, including:

providing a drive substrate having a first side;

forming a plurality of light sources provided at intervals on the first side of the drive substrate; and forming a first heat dissipation layer on the first side of the drive substrate, the first heat dissipation layer being located between adjacent light sources, the first heat dissipation layer being a transparent film.

According to a third aspect of embodiments of the present disclosure, there is provided a display device including:

the backlight module as described above; and a display panel disposed on a light output side of the backlight module.

It should be understood that the above general description and the following detailed description are exemplary and illustrative only and are not intended to limit the present disclosure

BRIEF DESCRIPTION OF THE DRAWINGS

The accompanying drawings which are incorporated in and constitute a part of the description illustrate embodiments consistent with the present disclosure and together with the description serve to explain the principles of the present disclosure. It will be apparent that the drawings described below are only some embodiments of the present disclosure, and other drawings may be obtained from them without creative effort for those of ordinary skill in the art.

DETAILED DESCRIPTION OF THE EMBODIMENTS

Exemplary embodiments will now be described more comprehensively with reference to the accompanying drawings. However, the exemplary embodiments can be implemented in a variety of forms and should not be construed as being limited to the examples set forth herein. Rather, these embodiments are provided so that the present disclosure will be more comprehensive and complete, and the concept of exemplary embodiments will be fully communicated to those skilled in the art.

Further, the described features, structures or characteristics may be incorporated in any suitable manner in one or more embodiments. In the following description, many specific details are provided to give a full understanding of the embodiments of the present disclosure. However, those skilled in the art will appreciate that one or more of the technical solutions of the present disclosure may be practiced without particular details, or other methods, group elements, devices, steps, etc. may be employed. In other instances, well-known methods, devices, implementations or operations are not shown or described in detail to avoid obscuring aspects of the present disclosure.

The present disclosure is described in further detail below in conjunction with the accompanying drawings and specific embodiments. It should be noted here that the technical features involved in the various embodiments of the present disclosure described below can be combined with each other as long as they do not conflict with each other. The embodiments described below by reference to the accompanying drawings are exemplary and are intended to be used for explanation of the present disclosure and are not to be construed as limiting.

Embodiment 1

Figure 1:
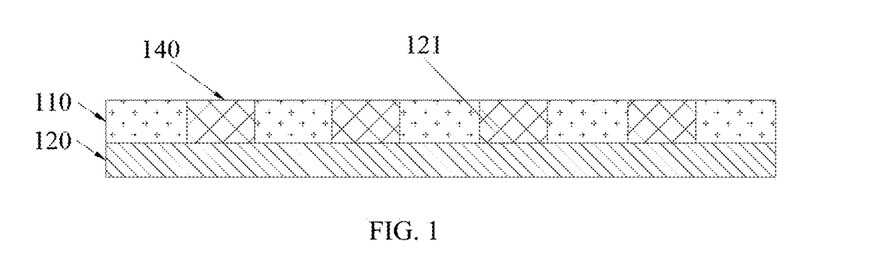
FIG. 1 is a structural schematic diagram of a backlight module in embodiment 1 of the present disclosure.

FIG. 1 is a structural schematic diagram of a backlight module in embodiment 1 of the present disclosure. Referring to FIG. 1, the backlight module includes a drive substrate 120, a light source 140 and a first heat dissipation layer 110.

The light source 140 may be a Mini LED chip or a Micro LED chip but is not limited thereto, which is determined depending on the case. A size of Mini LED chip is 100 microns to 200 microns, and a size of Micro LED chip is less than 100 microns. The drive substrate 120 includes a substrate and a protective layer in sequence. The substrate of the drive substrate 120 has a first side and a second side opposite in a thickness direction, and a plurality of light sources 140 are provided at intervals on the first side of the substrate of the drive substrate 120.

It should be understood that the light source 140 may be formed directly on the substrate of the drive substrate 120, or the light source 140 may be formed first and then bound to the substrate of the drive substrate 120 as appropriate. If the light source 140 is formed first and then bound to the substrate of the drive substrate 120, the drive substrate 120 may further include a plurality of pads 121. The plurality of pads 121 are provided at intervals on the first side of the substrate of the drive substrate 120, and the corresponding plurality of light sources 140 are provided at intervals on the pads 121 on the first side of the substrate, and the light sources 140 and the pads 121 are bound one by one.

The first heat dissipation layer 110 is a transparent film. The first heat dissipation layer 110 is disposed on the first side of the drive substrate 120 and between adjacent light sources 140, that is, the first heat dissipation layer 110 covers the first side of the drive substrate 120, and the light sources 140 are buried in the first heat dissipation layer 110. The light source 140 at an edge position of the drive substrate 120 may be buried in the first heat dissipation layer 110, or the side of the light source close to the edge may be exposed outside the first heat dissipation layer 110, which is determined depending on the case.

It should be noted that the first heat dissipation layer 110 is provided on the first side of the drive substrate 120. The first heat dissipation layer 110 mainly fills a gap between the adjacent light sources 140 and is in direct contact with the light sources 140. The periphery of the first heat dissipation layer 110 may be partially recessed close to the light source 140 and partially protruded away from the light source 140 to form an uneven surface, so that an area of the first heat dissipation layer 110 is smaller than an area of the drive substrate 120, but a heat dissipation area of the periphery of the first heat dissipation layer 110 is increased. In addition, the side of the first heat dissipation layer 110 away from the drive substrate 120 may be patterned to form an uneven surface, thereby increasing the heat dissipation area and achieving better heat dissipation effect.

In this disclosure, the first heat dissipation layer 110 is disposed on a first side of the drive substrate 120 and between adjacent light sources 140, The first heat dissipation layer 110 mainly fills the gap between the adjacent light sources 140, and is in directly contact with the light sources 140, so as to block the light source 140 the one hand, and absorb the heat of the light source 140 and radiate heat on the other hand, which is beneficial for reducing or eliminating the thermal coupling between the adjacent light sources 140 and helping the first side of the drive substrate 120 to dissipate heat.

In order to reduce or eliminate the thermal coupling between the adjacent light sources 140, the first heat dissipation layer 110 needs to have good thermal conductivity. In this embodiment, the first heat dissipation layer 110 is made from graphene, and other materials with good thermal conductivity can also be selected, which is determined depending on the specific situation. Graphene can be formed by an epitaxial growth method or a chemical vapor deposition (CVD) method, and can be firmly adhered to the drive substrate 120 without easily falling off Graphene has excellent thermal conductivity, mechanical strength and chemical stability, and its excellent thermal conductivity helps to eliminate thermal coupling between adjacent light sources 140 and helps drive the first side of the substrate 120 to dissipate heat. Its excellent mechanical strength and chemical stability can improve the thermal stability of the backlight module. In addition, graphene has high light transmittance, and the first heat dissipation layer 110 formed of graphene material does not absorb light and affect the optical effect.

It should be noted that the first heat dissipation layer 110 is disposed between adjacent light sources 140. The periphery of the light source 140 is in contact with the first heat dissipation layer 110. The larger the contact area, the faster the heat conduction and the better the heat dissipation effect. Because graphene also has high light transmittance, the thickness of the first heat dissipation layer 110 can be equal to the height of the light source 140 so that only one side of the light source 140 is exposed away from the drive substrate 120, and even the light source 140 can be completely buried in the first heat dissipation layer 110. Alternatively, the thickness of the first heat dissipation layer 110 may be less than the height of the light source 140 under the condition of satisfying heat dissipation conditions, and the thickness of the first heat dissipation layer 110 may depend on the specific situation.

Embodiment 2

Figure 2:
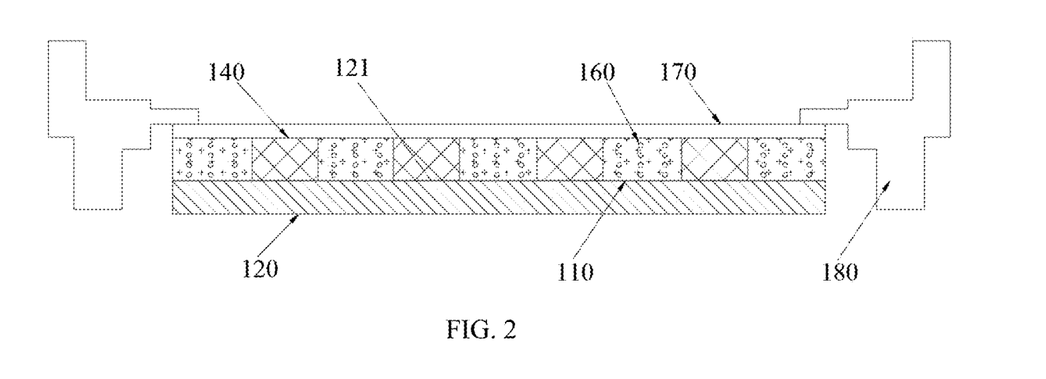
FIG. 2 is a structural schematic diagram of a backlight module in embodiment 2 of the present disclosure.

FIG. 2 is a structural schematic diagram of a backlight module in embodiment 2 of the present disclosure. Referring to FIG. 2, embodiment 2 is different from the first embodiment in that the first heat dissipation layer 110 is doped with a reflective medium 160.

The backlight module further includes an optical film 170 disposed on a side of the first heat dissipation layer 110 away from the drive substrate 120. The reflective medium 160 is doped in the first heat dissipation layer 110. The light source 140 emits light on a side away from the drive substrate 120. Side wall light is generated on a side of the light source 140 away from the drive substrate 120 close to the side wall of the light source 140. The first heat dissipation layer 110 doped with the reflective medium 160 can reflect or isolate the side wall light generated by the light source 140, and the light on the side of the light source 140 away from the drive substrate 120 is reflected back by the optical film 170, and the reflected light is reflected again by the first heat dissipation layer 110, thus the light utilization rate is improved.

When the reflective medium 160 is doped in the first heat dissipation layer 110, the reflective medium 160 includes a thermally conductive ceramic material. Specifically, the thermally conductive ceramic material is a combination of one or more of aluminum oxide, beryllium oxide, aluminum nitride and boron nitride. The thermally conductive ceramic material is doped in graphene and formed on the drive substrate 120 by physical vapor deposition. The thermally conductive ceramic material has excellent thermal conductivity, and the doped thermally conductive ceramic material does not affect the thermal conductivity of graphene.

The first heat dissipation layer 110 doped with the thermally conductive ceramic material can reflect or isolate the side wall light generated by the light source 140, and can also reduce or eliminate the thermal coupling between adjacent light sources. In addition, the first heat dissipation layer 110 has higher mechanical strength after the thermally conductive ceramic material is doped, and can be used as a support structure to support the optical film 170 and prevent the optical film 170 from being wrinkled.

When the first heat dissipation layer 110 is used as a support structure, the thickness of the first heat dissipation layer 110 may be provided to be greater than the height of the light source 140. The optical film 170 may include a light homogenizing film, a prism film and a diffusion film, and the optical film 170 may be an independent diaphragm or a film formed on the first heat dissipation layer 110, which depends on the case. When the optical film 170 is an independent film, the backlight module further includes a frame 180, the drive substrate 120 and the optical film 170 are both positioned inside the frame 180, the first heat dissipation layer 110 can be used as a lower limit of the optical film 170, the inward protruding part of the frame 180 can be used as an upper limit of the optical film 170, and the optical film 170 is supported between the inward protruding part of the frame 180 and the first heat dissipation layer 110.

After the thermally conductive ceramic material is doped, the side of the first heat dissipation layer 110 away from the drive substrate 120 can reflect light, therefore, the first heat dissipation layer 110 can replace the reflective film in the backlight module, thereby reducing the thickness of the backlight module to a certain extent.

When the reflective medium 160 is doped in the first heat dissipation layer 110, the thickness of the first heat dissipation layer 110 may be less than or equal to the height of the light source 140. The thickness of the first heat dissipation layer 110 is equal to the height of the light source 140 and can reflect as much side wall light generated by the light source 140 as possible, thereby improving the light utilization rate. The thickness of the first heat dissipation layer 110 is smaller than the height of the light source 140. Specifically, the thickness of the first heat dissipation layer 110 is 2/3 to 4/5 of the height of the light source 140. For example, the thickness of the first heat dissipation layer 110 is 2/3, 11/15, 4/5 of the height of the light source 140, etc. With this arrangement, the first heat dissipation layer 110 can reflect the side wall light generated by the light source 140 while preventing the graphene doped with the reflective medium 160 from covering the surface of the light source 140 to block light.

Embodiment 3

Figure 3:
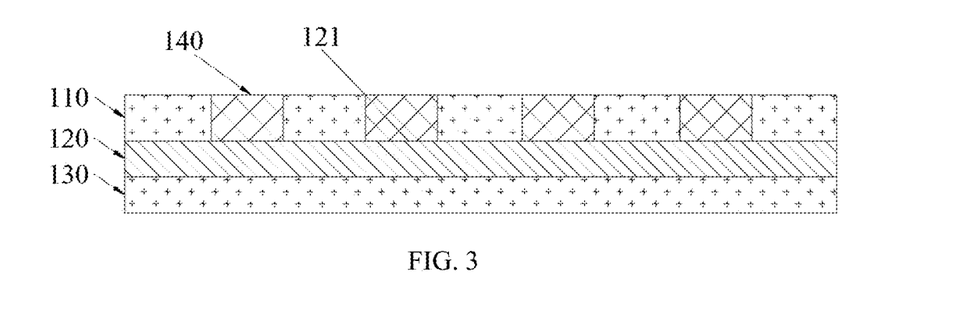
FIG. 3 is a structural schematic diagram of a backlight module in embodiment 3 of the present disclosure.

FIG. 3 is a structural schematic diagram of a backlight module in embodiment 3 of the present disclosure. Referring to FIG. 3, the difference between embodiment 3 and embodiment 1 is that the backlight module in embodiment 3 further includes a second heat dissipation layer 130.

The substrate of the drive substrate 120 has a first side and a second side opposite in a thickness direction, and a plurality of light sources 140 are provided at intervals on the first side of the substrate of the drive substrate 120, and a second heat dissipation layer 130 is provided on the second side, that is, the first heat dissipation layer 110 and the second heat dissipation layer 130 are provided on both sides of the drive substrate 120, respectively.

The second heat dissipation layer 130 is arranged on the second side of the drive substrate 120, which helps the second side of the drive substrate 120 to dissipate heat, and the front and back sides of the drive substrate 120 both dissipate heat, so that the backlight module has better thermal stability and longer service life, and the display quality of the display device can be improved when used in the display device.

It should be noted that the periphery of the second heat dissipation layer 130 may be partially recessed inward and partially protruded outward to form an uneven surface, so that an area of the second heat dissipation layer 130 is smaller than that of the drive substrate 120, but a heat dissipation area of the periphery of the second heat dissipation layer 130 is increased. In addition, the side of the second heat dissipation layer 130 away from the drive substrate 120 may be patterned to form an uneven surface, thereby increasing the heat dissipation area and achieving better heat dissipation effect.

The second heat dissipation layer 130 is provided on the second side of the drive substrate 120 and the material thereof may be graphene. The first heat dissipation layer 110 and the second heat dissipation layer 130 are made of the same material and have excellent thermal conductivity, allowing double heat dissipation on both the front and back sides of the drive substrate 120. Further, the same process may be used to form the first heat dissipation layer 110 and the second heat dissipation layer 130, thereby shortening the process flow and reducing the production cost.

Embodiment 4

Figure 4:
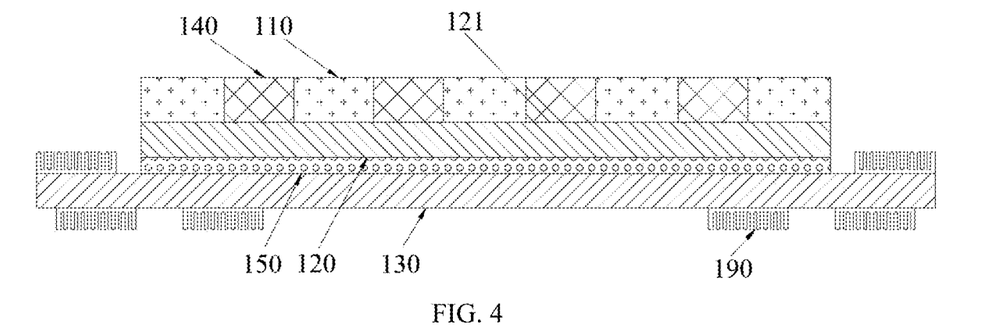
FIG. 4 is a structural schematic diagram of a backlight module in embodiment 4 of the present disclosure.

FIG. 4 is a structural schematic diagram of a backlight module in embodiment 4 of the present disclosure. Referring to FIG. 4, the difference between embodiment 4 and embodiment 3 is that the material of the second heat dissipation layer 130 is different. In this embodiment, the second heat dissipation layer 130 is a metal sheet having excellent conductivity, such as a metal layer, an aluminum layer, a copper alloy layer.

Referring to FIG. 4, the second heat dissipation layer 130 may be provided with heat sinks 190 to increase the heat dissipation area and obtain better heat dissipation effect, but the heat sinks 190 are not limited to being provided, and the side of the second heat dissipation layer 130 away from the drive substrate 120 may be patterned to form an uneven surface, which is determined depending on the specific situation.

The heat sinks 190 may be disposed on a side of the second heat dissipation layer 130 away from the drive substrate 120. When a size of the second heat dissipation layer 130 is larger than that of the drive substrate 120, the heat sinks 190 may also be provided on the side of the second heat dissipation layer 130 close to the drive substrate 120, that is, the drive substrate 120 is located in the middle of the second heat dissipation layer 130 and the heat sinks 190 are located around the drive substrate 120.

The metal second heat dissipation layer 130 not only helps the second side of the drive substrate 120 to dissipate heat, but also serves as a support and bearing function for the backplate of the display device.

Figure 5:
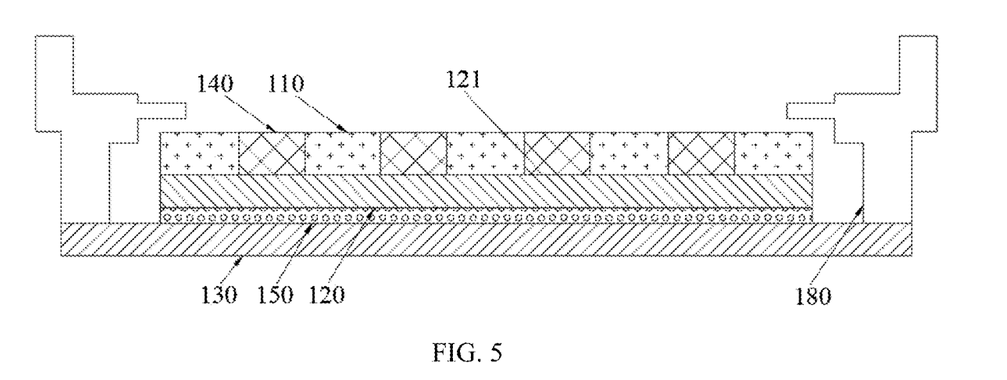
FIG. 5 is a structural schematic diagram of the backlight module when a second heat dissipation layer serves as a backplate in embodiment 4 of the present disclosure.

FIG. 5 is a structural schematic diagram of the backlight module when a second heat dissipation layer serves as a backplate in embodiment 4 of the present disclosure. As shown in FIG. 5, when the second heat dissipation layer 130 serves as the backplate, the backlight module further includes a frame 180, and the drive substrate 120 is located inside the frame 180. The second heat dissipation layer 130 is arranged on the second side of the drive substrate 120, and the second heat dissipation layer 130 is connected to the frame 180 to serve as the backplate of the display device.

When the second heat dissipation layer 130 is a metal sheet. The second side of the drive substrate 120 and the side of the second heat dissipation layer 130 close to the drive substrate 120 cannot be absolutely flat, and there is a gap between the drive substrate 120 and the second heat dissipation layer 130 after assembly and bonding, and the thermal conductivity of the air in the gap is far lower than that of the second heat dissipation layer 130, so that the heat dissipation effect of the second heat dissipation layer 130 is reduced.

Referring to FIG. 4, a thermally conductive filler layer 150 is also provided between the second heat dissipation layer 130 and the drive substrate 120. The thermally conductive filler layer 150 includes a thermally conductive silica gel or a heat dissipation aluminum foil. The thermally conductive silica gel has fluidity, the heat dissipation aluminum foil is deformable, and both the thermally conductive silica gel and the heat dissipation aluminum foil have excellent thermal conductivity. The thermally conductive silica gel or the heat dissipation aluminum foil fills the gap between the drive substrate 120 and the second heat dissipation layer 130, and discharges air with poor thermal conductivity, which can greatly improve the heat dissipation effect of the second heat dissipation layer 130.

It should be noted that the thermally conductive filler layer 150 is not limited to thermally conductive silica gel and heat dissipation aluminum foil, but may be made of other materials as long as it can ensure a gap-free fit with the drive substrate 120, which is determined depending on the situation.

Embodiment 5

Figure 6:
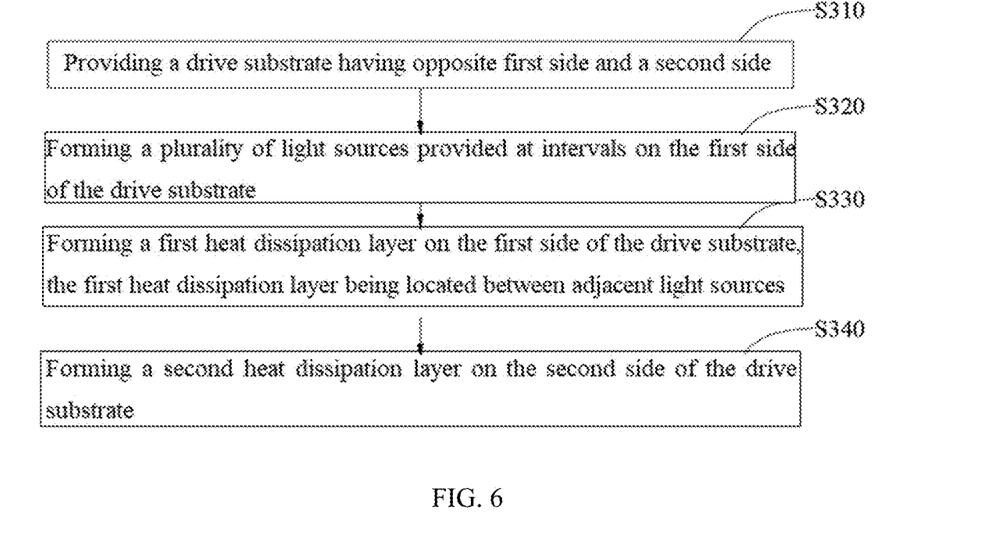
FIG. 6 is a flow chart of a forming method of a backlight module in embodiment 5 of the present disclosure.

The present embodiment provides a forming method of a backlight module for forming the backlight modules mentioned in embodiments 1 to 4. FIG. 6 is a flow chart of a forming method of a backlight module in embodiment 5 of the present disclosure. Referring to FIG. 6, the forming method of the backlight module includes:

S310: providing a drive substrate 120 having opposite first side and a second side;

S320: forming a plurality of light sources 140 provided at intervals on the first side of the drive substrate 120;

S330: forming a first heat dissipation layer 110 on the first side of the drive substrate 120, the first heat dissipation layer 110 being located between adjacent light sources 140;

S340: forming a second heat dissipation layer 130 on the second side of the drive substrate 120.

It should be noted that when the second heat dissipation layer 130 is a metal layer, the sequence of forming the first heat dissipation layer 110 and the second heat dissipation layer 130 can be adjusted, which is determined depending on the specific situation. When the second heat dissipation layer 130 is a graphene coating, the first heat dissipation layer 110 and the second heat dissipation layer 130 can be completed in the same process by adopting the same process, thereby shortening the process flow and reducing the production cost.

The sequence of forming the light source 140 and forming the first heat dissipation layer 110 on the first side of the drive substrate 120 can also be adjusted depending on the situation. If the light source 140 is formed first and then the first heat dissipation layer 110 is formed, the first heat dissipation layer 110 can fill the gap between the light sources 140, and the first heat dissipation layer 110 is a graphene coating, which can be firmly attached to the drive substrate 120 and is not easy to fall off, so the first heat dissipation layer 110 can protect the light source 140 and prevent the light source 140 from being damaged and falling off. If the first heat dissipation layer 110 is formed first, the first heat dissipation layer 110 is then patterned to form a groove region to which the light source 140 is bound, the groove formed by photolithography or etching can be a diffusion port. That is to say, one end of the groove close to the drive substrate 120 is smaller than an end of the groove away from the drive substrate 120, which can reduce the friction between the side wall of the light source 140 and the first heat dissipation layer 110 when binding the light source 140, and can make the first heat dissipation layer 110 and the side wall of the light source 140 form a good contact, which is conducive to the heat dissipation of the light source 140 through the first heat dissipation layer 110.

Figure 7:
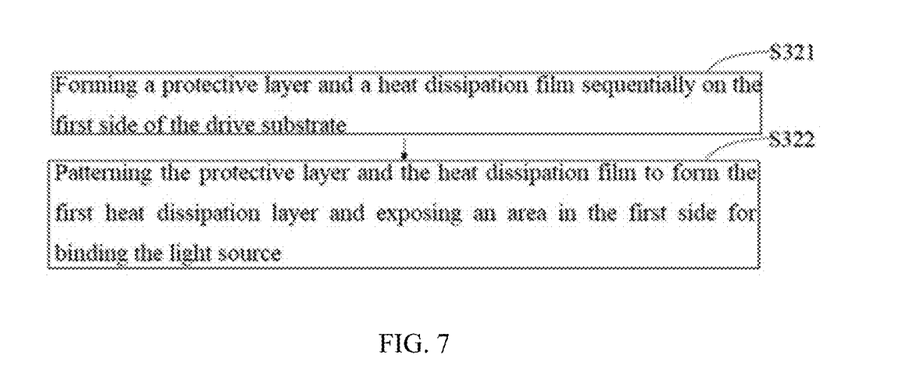
FIG. 7 is a flow chart of a method for forming a first heat dissipation layer in embodiment 5 of the present disclosure.

FIG. 7 is a flow chart of a method for forming a first heat dissipation layer in embodiment 5 of the present disclosure. Referring to FIG. 6 and FIG. 7, step S320 specifically includes:

S321: forming a protective layer and a heat dissipation film sequentially on the first side of the drive substrate 120;

S322: patterning the protective layer and the heat dissipation film to form the first heat dissipation layer 110 and exposing an area on the first side for binding light source 140.

It should be noted that to form the first heat dissipation layer 110, a heat dissipation film is formed on the protective layer by epitaxial growth or chemical vapor deposition of graphene, and then the protective layer and the heat dissipation film are patterned by photolithography or etching, and the heat dissipation film is patterned to form the first heat dissipation layer 110.

The light source 140 may be formed directly on the substrate of the drive substrate 120, or the light source 140 may be formed first and then bound to the substrate of the drive substrate 120. If the light source 140 is formed first and then bound to the substrate of the drive substrate 120, the drive substrate 120 may include a substrate and a pad 121 arranged on the substrate, the protective layer is covered on the substrate, the pad 121 is exposed after the protective layer is patterned, and a part of the protective layer is still covered outside the pad 121 for protecting the substrate and its accessory structures. The material of the protective layer includes an organic substance, which helps dissolve the flux and causes the light source 140 and the pad 121 to contact and complete the binding, and an ultraviolet curing agent doped with the organic substance, so that the protective layer can be formed by subsequent ultraviolet curing treatment of the organic substance.

Embodiment 6

Figure 8:
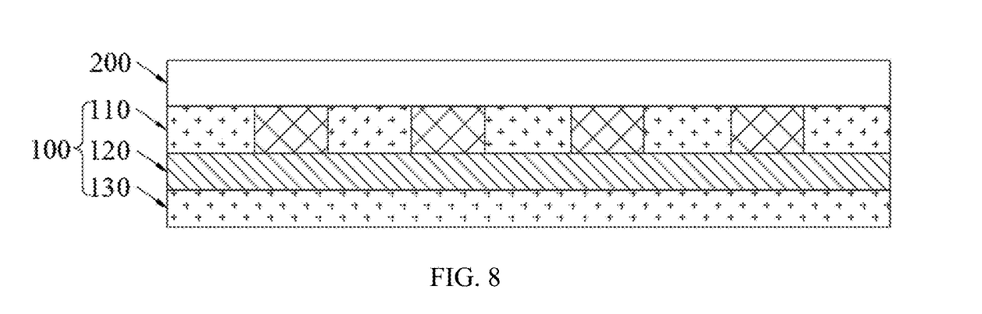
FIG. 8 is a structural schematic diagram of a display device in embodiment 6 of the present disclosure.

The present embodiment provides a display device. FIG. 8 is a structural schematic diagram of a display device in embodiment 6 of the present disclosure. Referring to FIG. 8, the display device includes a backlight module 100 having a light output side and a light input side opposite to each other in a thickness direction thereof, and a display panel 200 disposed on the light output side of the backlight module 100.

It should be noted that the display panel 200 may be a liquid crystal display panel, and the backlight module 100 is the backlight module 100 mentioned in embodiments 1 to 4. It should be understood that the backlight module 100 may further include a light guide plate, a reflective layer and the like. The display device can be widely used in various consumer electronic products such as mobile phones, televisions, personal digital assistants, digital cameras, notebook computers, computer monitors and the like.

The backlight module 100 can also be used for a direct display device which is divided into a mini LED direct display and a micro LED direct display according to different display modes. The direct display device uses light source LED to display pixels, which provides the basic unit of imaging, thereby achieving image display. It has the advantages of high brightness, wide color gamut, high contrast, high speed response, low power consumption and long life. In the display effect, compared with ordinary LCD, it has many advantages such as good color integrity, contrast, thinner and lighter.

The terms "first", "second" are for descriptive purposes like only and cannot be construed as indicating or implying relative importance or implying the number of the indicated technical features. Thus, the features defined as "first" or "second" may be explicitly or implicitly defined as including one or more of the features. In the description of the present disclosure, "a plurality of" means two or more, unless explicitly and specifically defined otherwise.

In the present disclosure, the terms "assembly", "connection" and the like are understood in a broad sense and may be, for example, a fixed connection, a detachable connection, or as a unit, unless otherwise expressly specified and limited; the connection can be a mechanical connection or an electrical connection; or the connection can be a directly connection or an indirect connection by intermediate media, and it can be the internal communication of two elements or the interaction between two elements. For those ordinarily skilled in the art, the specific meanings of the above terms in the present disclosure will be understood according to the specific circumstances.

In the description of this description, illustrations of the reference terms "some embodiments", "exemplified", etc. mean that specific features, structures, materials, or features described in connection with the embodiment or example are included in at least one embodiment or example of the present disclosure. In the description, the schematic formulation of the above terms need not be directed to the same embodiments or examples. Further, the specific features, structures, materials or features described may be combined in a suitable manner in any one or more embodiments or examples. Further, without contradicting one another, those skilled in the art may combine and incorporate different embodiments or examples described in the description and features of different embodiments or examples.

Although the embodiments of the present disclosure have been shown and described above, understandably, the above-described embodiments are exemplary and cannot be construed as limiting the present disclosure. Those of ordinary skill in the art may make changes, modifications, substitutions and modifications to the above-described embodiments within the scope of the present disclosure. Therefore, any changes or modifications made in accordance with the claims and descriptions of the present disclosure should fall within the scope of the present disclosure.

What is claimed is:

1. A backlight module comprising:
   a drive substrate having a first side;
   a plurality of light sources provided at intervals on the first side of the drive substrate; and
   a first heat dissipation layer disposed on the first side of the drive substrate and between adjacent light sources, the first heat dissipation layer being a transparent film;
   wherein the first heat dissipation layer comprises a graphene coating;
   wherein at least one side of each light source away from the drive substrate is a light emitting surface, the first heat dissipation layer is doped with a reflective medium, and the reflective medium reflects light emitted from an edge part of the light emitting surface and light reflected by the optical film;
   wherein a thickness of the first heat dissipation layer is less than or equal to a height of the plurality of light sources;
   wherein the backlight module further comprises a second heat dissipation layer and a frame, and the drive substrate is located within the frame, wherein the second heat dissipation layer is connected to the frame, wherein the backlight module further comprises a thermally conductive filler layer disposed between the second heat dissipation layer and the drive substrate;
   wherein an unequal gap is formed between the frame and the first heat dissipation layer, the drive substrate, and the thermally conductive filler layer.

2. The backlight module according to claim 1, wherein the backlight module further comprises an optical film disposed on a side of the first heat dissipation layer away from the drive substrate;
   wherein the reflective medium reflects light reflected by the optical film; and
   wherein the reflective medium comprises a thermally conductive ceramic material being a combination of one or more of aluminum oxide, beryllium oxide, aluminum nitride and boron nitride.

3. The backlight module according to claim 1, wherein the drive substrate further comprises a second side opposite to the first side in a thickness direction of the drive substrate, the second heat dissipation layer is disposed on the second side of the drive substrate.

4. The backlight module according to claim 1, wherein the second heat dissipation layer comprises a graphene coating or a metal layer; and/or
   the thermally conductive filler layer comprises a thermally conductive silica gel or a heat dissipation aluminum foil.
   wherein at least one side of each light source away from the drive substrate is a light emitting surface, the first heat dissipation layer is doped with a reflective medium, and the reflective medium reflects light emitted from an edge part of the light emitting surface:
   wherein a thickness of the first heat dissipation layer is less than or equal to a height of the plurality of light sources.

5. A forming method of a backlight module, comprising:
   providing a drive substrate having a first side;
   forming a plurality of light sources provided at intervals on the first side of the drive substrate; and
   forming a first heat dissipation layer on the first side of the drive substrate, the first heat dissipation layer being located between adjacent light sources;
   wherein the first heat dissipation layer comprises a graphene coating;
   wherein at least one side of each light source away from the drive substrate is a light emitting surface, the first heat dissipation layer is doped with a reflective medium, and the reflective medium reflects light emitted from an edge part of the light emitting surface and light reflected by the optical film;
   wherein a thickness of the first heat dissipation layer is less than or equal to a height of the plurality of light sources;

wherein the backlight module further comprises a second heat dissipation layer and a frame, and the drive substrate is located within the frame, wherein the second heat dissipation layer is connected to the frame, wherein the backlight module further comprises a thermally conductive filler layer disposed between the second heat dissipation layer and the drive substrate;

wherein an unequal gap is formed between the frame and the first heat dissipation layer, the drive substrate, and the thermally conductive filler layer.

6. The forming method of the backlight module according to claim 5, wherein forming the first heat dissipation layer on the first side of the drive substrate comprises:

forming a protective layer and a heat dissipation film sequentially on the first side of the drive substrate; and patterning the protective layer and the heat dissipation film to form the first heat dissipation layer and exposing an area on the first side for binding the plurality of light sources.

7. A display device comprising:

a backlight module; and a display panel disposed on a light output side of the backlight module;

wherein the backlight module comprises:

a drive substrate having a first side;

a plurality of light sources provided at intervals on the first side of the drive substrate; and a first heat dissipation layer disposed on the first side of the drive substrate and between adjacent light sources, the first heat dissipation layer being a transparent film; wherein the first heat dissipation layer comprises a graphene coating;

wherein at least one side of each light source away from the drive substrate is a light emitting surface, the first heat dissipation layer is doped with a reflective medium, and the reflective medium reflects light emitted from an edge part of the light emitting surface and light reflected by the optical film;

wherein a thickness of the first heat dissipation layer is less than or equal to a height of the plurality of light sources;

wherein the backlight module further comprises a second heat dissipation layer and a frame, and the drive substrate is located within the frame, wherein the second heat dissipation layer is connected to the frame, wherein the backlight module further comprises a thermally conductive filler layer disposed between the second heat dissipation layer and the drive substrate;

wherein an unequal gap is formed between the frame and the first heat dissipation layer, the drive substrate, and the thermally conductive filler layer.

8. The display device according to claim 7, wherein the backlight module further comprises an optical film disposed on a side of the first heat dissipation layer away from the drive substrate;

wherein the reflective medium reflects light reflected by the optical film; and wherein the reflective medium comprises a thermally conductive ceramic material being a combination of one or more of aluminum oxide, beryllium oxide, aluminum nitride and boron nitride.

9. The display device according to claim 7, wherein the drive substrate further comprises a second side opposite to the first side in a thickness direction of the drive substrate, the second heat dissipation layer is disposed on the second side of the drive substrate.

10. The display device according to claim 7, wherein the second heat dissipation layer comprises a graphene coating or a metal layer; and/or the thermally conductive filler layer comprises a thermally conductive silica gel or a heat dissipation aluminum foil.

* * * * *